United States Patent [19]

Okita et al.

[11] Patent Number: 4,619,855

[45] Date of Patent: Oct. 28, 1986

[54] MAGNETIC RECORDING MEDIUM WITH ELECTRON BEAM CURED MAGNETIC LAYER

[75] Inventors: Tsutomu Okita; Nobutaka Yamaguchi; Hiroshi Hashimoto, all of Kanagawa, Japan

[73] Assignee: Fuji Photo Film Co., Ltd., Kanagawa, Japan

[21] Appl. No.: 542,931

[22] Filed: Oct. 18, 1983

[30] Foreign Application Priority Data

Oct. 18, 1982 [JP] Japan ................................ 57-181485

[51] Int. Cl.$^4$ .............................................. G11B 5/70
[52] U.S. Cl. .................................. 428/143; 252/62.54; 360/134; 360/135; 360/136; 427/44; 427/128; 428/148; 428/425.9; 428/522; 428/694; 428/900
[58] Field of Search ............... 428/900, 694, 695, 522, 428/425.9; 427/44, 131, 130, 128; 360/134–136; 252/62.54

[56] References Cited

U.S. PATENT DOCUMENTS

| | | | |
|---|---|---|---|
| 4,004,997 | 1/1977 | Tsukamoto | 428/458 |
| 4,307,154 | 12/1981 | Hosaka | 428/413 |
| 4,337,288 | 6/1982 | Tahenaka et al. | 428/409 |
| 4,343,831 | 8/1982 | Tsuji | 427/128 |
| 4,368,238 | 1/1983 | Somezuma et al. | 428/694 |
| 4,368,239 | 1/1983 | Nakajima | 428/694 |
| 4,368,242 | 1/1983 | Nakajima et al. | 428/694 |
| 4,400,435 | 8/1983 | Yoda et al. | 428/695 |
| 4,407,853 | 10/1983 | Okita et al. | 427/48 |
| 4,435,485 | 3/1984 | Nakajima et al. | 428/900 |
| 4,448,846 | 5/1984 | Chang et al. | 428/900 |
| 4,448,848 | 5/1984 | Okita | 428/694 |
| 4,496,626 | 1/1985 | Kasuga | 428/694 |
| 4,508,782 | 4/1985 | Miura | 428/694 |
| 4,560,616 | 12/1985 | Okita | 428/900 |

FOREIGN PATENT DOCUMENTS

WO8102646  9/1981  PCT Int'l Appl. .................. 427/48

*Primary Examiner*—Ellis P. Robinson
*Attorney, Agent, or Firm*—Sughrue, Mion, Zinn, Macpeak and Seas

[57] ABSTRACT

A magnetic recording medium is disclosed. The medium is comprised of a support base having an average center line roughness (Ra) of 0.035 $\mu$m or less which has coated thereon a magnetic layer. The magnetic layer is comprised of ferromagnetic fine particles dispersed in a binder comprising (1) a polymer selected from the group consisting of nitrocellulose resins, vinyl chloride-vinyl acetate resins and vinyl chloride-vinyl propionate type resins; (2) a urethane resin; and (3) a compound having 2 or more acrylate groups or methacrylate groups in the molecule thereof. The magnetic layer is cured by radiation with electron beams and has excellent electromagnetic properties as well as high durability. The magnetic medium provides less abrasiveness and the magnetic coating composition is stable and homogeneous during storage.

14 Claims, No Drawings

MAGNETIC RECORDING MEDIUM WITH ELECTRON BEAM CURED MAGNETIC LAYER

FIELD OF THE INVENTION

The present invention relates to magnetic recording media such as video tapes, audio tapes or computer tapes. More specifically, it relates to a magnetic recording medium having a magnetic layer cured by an electron beam.

BACKGROUND OF THE INVENTION

Binders which have been commonly used for magnetic recording media include thermoplastic resins such as vinyl chloride-vinyl acetate resins, vinyl chloride-vinylidene chloride resins, cellulose resins, acetal resins, urethane resins and acrylonitrile-butadiene resins used alone or in combination. However, with such binders the magnetic layer generally has poor wear resistance and the tape guiding systems which contact with magnetic tapes are stained during tape running.

Various improvements have been proposed where a thermosetting resin such as melamine resins or urea resins is used as a binder, or a binder which can be cross-linked by a chemical reaction such as in isocyanate compound or an epoxy compound is added to the above-described thermoplastic resins. However, disadvantages occur when using such cross-linking type binder. Firstly, the storage stability of the resin solution in which ferromagnetic particles are dispersed is low, i.e., the pot life is short and the physical properties of the resulting magentic coating composition cannot be kept homogeneous, and accordingly, magnetic tapes cannot be uniformly prepared. Secondly, after coating and drying the magnetic coating composition, heat treatment is necessary to cure a coating layer thereby requiring a long period of time to manufacture magnetic recording media.

In order to eliminate the above disadvantages, a method has been proposed where a magnetic recording medium is prepared by using a combination of an acrylate oligomer and an acrylate type monomer as a binder and curing the binder by electron beam radiation after drying, as disclosed in Japanese Patent Publication No. 12423/72, Japanese Patent Application (OPI) Nos. 13639/72, 15104/72, 77433/75, 25231/81, 86130/82, 86131/82 and 127926/82 (the term "OPI" as used herein refers to a "published unexamined Japanese patent application"), U.S. Pat. No. 4,368,239, German Pat. No. 2,100,037 and Dutch Pat. No. 7,118,222. However, a magnetic recording medium having satisfactory durability and electromagnetic properties cannot be obtained in accordance with the above-described conventional methods.

Recently, it has been strongly desired that the video head abrasiveness of a video tape recorder (hereinafter "head abrasiveness") be minimized in VHS and β-type home video cassette tape recorders.

Further, as video cassette tape recorders have come to have multi-functions, video tapes used therefor are required to withstand use under severe conditions. However, it has hitherto been impossible to produce a magnetic recording medium having a magnetic layer which is provided with durability and electromagnetic properties as well as less head abrasiveness which satisfy the above requirements.

The inventors have attained the present invention as a result of extensive studies for improvements of conventional magnetic recording media.

SUMMARY OF THE INVENTION

A primary object of the present invention is to provide a magnetic recording medium having excellent electromagnetic properties.

Another object of the present invention is to provide a magnetic recording medium having a magnetic layer with high durability.

A further object of the present invention is to provide a magnetic recording medium which provides less head abrasiveness.

A still further object of the present invention is to provide a magnetic recording medium coated with a magnetic coating composition which is stable and homogeneous during storage.

A yet further object of the present invention is to provide a magnetic recording medium which is prepared without a heat treatment step which is usually necessary for curing a coated layer.

The above objects of the present invention can be attained with a magnetic recording medium comprising a support having coated thereon a magnetic layer containing ferromagnetic fine particles and (1) at least one polymer selected from the group consisting of nitrocellulose resins, vinyl chloride-vinyl acetate type resins and vinyl chloride-vinyl propionate type resins, (2) a urethane resin, (3) at least one compound having two or more of acrylate groups or methacrylate groups in the molecule thereof, said support having an average center line roughness (Ra) of 0.035 μm or less and said magnetic layer being cured by radiation with electron beams.

DETAILED DESCRIPTION OF THE INVENTION

In accordance with the present invention, it has been surprisingly found that a magnetic recording medium having excellent durability, running properties and electromagnetic characteristics as well as less head abrasiveness can be obtained. Such a medium is obtained by coating a magnetic coating composition comprising, as binders, at least one polymer as defined above, a urethane resin and at least one compound having two or more of acrylate groups or methacrylate groups in the molecule thereof which is polymerizable by electron beam radiation on a support having an average center line roughness (Ra) of 0.035 μm or less, and then radiating the coated layer with an electron beam. The improved medium is obtained due to the synergistic effects of these components and their properties.

The term "center line roughness (Ra)" as used herein as defined in JIS B0601 and is expressed in terms of micrometer (μm) at a cut off value of 0.08 mm. The surface roughness of the support is determined using "Surfcom 30B" (manufactured by Tokyo Seimitsu Co., Ltd.).

Of the above polymers, the vinyl chloride-vinyl acetate type resins and the vinyl chloride-vinyl propionate resins preferably have a molecular weight in the range of 20,000 to about 100,000 and include a vinyl chloride-vinyl acetate copolymer (80/20 to 95/5 by weight), a vinyl chloride-vinyl propionate copolymer (80/20 to 95/5 by weight) as well as these copolymers containing less than 15 wt% of a third component, e.g., vinyl alcohol, maleic acid or a vinyl monomer containing an OH group, a CO₂H group, etc., at the terminal thereof. Further, these copolymers may contain a fourth component such as maleic acid, vinyl propionate, etc. Particularly preferred polymers include a nitrocellulose resin, a copolymer of vinyl chloride-vinyl acetate-vinyl alcohol (vinyl alcohol content: 1 to 15 wt%) and a copolymer of vinyl chloride-vinyl acetate-maleic acid (maleic acid content: 0.5 to 10 wt%).

The urethane resin can be a polyether type urethane resin or a polyester type urethane resin. A preferred range of the molecular weight of the urethane resin is from about 5,000 to about 100,000, more preferably, from 10,000 to 50,000. The dispersibility of ferromagnetic particles is deteriorated outside of the above range.

Examples of compounds having two or more acryloyl groups or methacryloyl groups in the molecule include acrylates such as diethylene glycol diacrylate, triethylene glycol diacrylate, tetraethylene glycol diacrylate, trimethylolpropane triacrylate or pentaerythritol tetraacrylate; methacrylates such as diethylene glycol dimethacrylate, triethylene glycol trimethacrylate, tetraethylene glycol dimethacrylate, trimethylolpropane trimethacrylate or pentaerythritol tetramethacrylate; esters of dihydric or higher polyols and acrylic acids or methacrylic acids; and compounds having two or more acryloyl groups or methacryloyl groups at the terminal groups of the main polymer chain or in the side chains thereof. Preferred compounds are diethylene glycol diacrylate, trimethylolpropane triacrylate and triethylene glycol diacrylate.

The compounds having acryloyl group or methacryloyl group at the terminal groups of the main chain or in the side chains thereof are referred to in A. Vrancken, *Fatipec Congress*, 11, 19 (1972). For example, these compounds can be shown by the following structure.

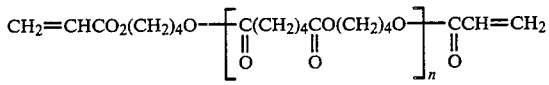

wherein n is an integer. The polyester skeleton of the above compounds can be a polyurethane skeleton, an epoxy resin skeleton, a polyether skeleton or a polycarbonate skeleton or a mixture thereof. The molecular weight is preferably in the range of from 1,000 to 20,000 but is not particularly limited.

The above-described compounds can be a mixture. Further, a compound having one carbon-carbon unsaturated bond in its molecule which can be polymerized by electron beams can also be added to the composition of the present invention. Preferred examples of such compounds are alkyl acrylates such as methyl acrylate, 2-ethylhexyl acrylate, and compounds containing an unsaturated group such as styrene, acrylonitrile, N-vinylpyrrolidone and the like.

The mixing ratio of the polymer (1)/the urethane resin (2) is 20 to 90 parts by weight/80 to 10 parts by per 100 parts by weight of the mixture of the polymer (1) and the urethane resin (2). If the compound is used at a proportion over the upper limit, an increased dose of electron beams is necessary for polymerization. If the compound is used at a proportion below the lower limit, sufficient cross-linking does not occur and thus satisfactory durability of the resulting magnetic recording medium cannot be obtained.

The binder composition according to the present invention comprising at least one polymer (1), a urethane resin (2) and a compound having two or more acryloyl groups or methacryloyl groups (3) can be used in a proportion of about ½ to about 1/10 parts by weight, preferably ⅛ to ⅙ parts by weight, per part by weight of the ferromagnetic powder.

Ferromagnetic powders used in the present invention include ferromagnetic iron oxide fine powders, Co-doped ferromagnetic iron oxide fine powders, ferromagnetic chromium dioxide fine powders, ferromagnetic alloy fine powders and barium ferrite. The acicular ratio of ferromagnetic iron oxide and chromium dioxide is 2/1 to 20/1, preferably more than 5/1. An average length of the ferromagnetic powders is about 0.2 to 2.0 μm. The ferromagnetic alloy fine powders generally have a metal content more than 75 wt%, with more than 80 wt% of the metal content being a ferromagnetic metal (i.e., Fe, Co, Ni, Fe-Co, Fe-Ni, Co-Ni, Fe-Co-Ni), and has a longer diameter of less than about 1.0 μm.

Materials for the support on which the magnetic coating composition is coated include plastics, for example, polyesters such as polyethylene terephthalate or polyethylene 2,6-naphthalate; polyolefins such as polyethylene or polypropylene; cellulose derivatives such as cellulose triacetate; plastics such as polycarbonate, polyimide or polyamide-imide; non-magnetic metals such as aluminum, copper, tin, zinc or non-magnetic alloy including the above metals; and laminates comprising the above plastics and non-magnetic metals formed by, for example, vacuum deposition. Preferred examples of the supports are polyethylene terephthalate, polyethylene 2,6-naphthalate and polyimide films. The thickness of supports varies depending upon the utility of the magnetic recording medium, but generally in the range of about 5 to about 100 μm, preferably 6 to 20 μm.

It is necessary that the support has an average center line roughness (Ra) of 0.035 μm or less (cut off: 0.08 mm), preferably in the range of 0.005 μm to 0.035 μm, on the surface on which the magnetic layer is provided. The support having different surface smoothness (or roughness) between the two sides may be used, if necessary. The magnetic layer can be provided on the support which has been coated with a lubricant or a surface active agent on the surface opposite the magnetic layer. Also, a lubricant or a surfactant can be coated on the surface of the support opposite the magnetic layer after Additives such as a lubricant, an abrasive, a dispersing agent, a rust-preventing agent or an antistatic agent can be added to the magnetic coating composition of the present invention. Examples of lubricants include saturated or unsaturated higher fatty acids, fatty acid esters, high fatty acid amides, higher alcohols, silicone oil, mineral oils, edible oils or fluoride type compounds. These additives can be added when a coating composition is prepared, or can be coated or sprayed on the surface of the magnetic layer with or without using an organic solvent after drying, smoothing the magnetic layer or after curing the magnetic layer by electron beam.

These additives as well as the preparation of magnetic coating composition, coating methods, smoothing treatment and the like are disclosed in, for example, U.S. Pat. No. 4,135,016.

A scanning method, a double scanning method, a curtain beam method or a broad beam curtain method can be used for accelerating electron beams.

The electron beam used has an accelerating voltage of 100 to 1,000 kv, preferably 150 to 300 kv. The absorption dose is 0.5 to 20 megarads, preferably 1 to 15 megarads. If the accelerating voltage is less than 100 kv, the transmitted amount of energy is insufficient and if the accelerating voltage is more than 1,000 kv, the energy efficiency used for polymerization is lowered making the process uneconomical. If the absorption dose is less than 0.5 megarad, the curing reaction is insufficient to obtain a magnetic layer having a satisfactory mechanical strength and if the absorption dose is more than 20 megarads, the energy efficiency used for the curing reaction is lowered or a radiated object generates heat and the support, particularly a plastic support, may be deformed.

The magnetic layer provided on the support generally has a dry thickness of about 0.5 to about 10 $\mu$m, preferably 1 to 5 $\mu$m.

The present invention is further illustrated in greater detail by the following examples and comparative examples, but the present invention is not limited thereto. In examples and comparative examples, all parts are by weight unless otherwise indicated.

EXAMPLE 1

| | parts |
|---|---|
| $\gamma$-Fe$_2$O$_3$ | 400 |
| Nitrocellulose (RS½H, manufactured by Daicel Chemical Industries, Ltd.) | 50 |
| Urethane resin (condensation product of adipic acid, butane diol and tolylene diisocyanate) | 12 |
| Ester acrylate oligomer ("Aronix M6100", manufactured by Toagosei Chemical Industry Co., Ltd.) | 30 |
| Diethylene glycol diacrylate | 8 |
| Lecithin | 4 |
| Stearic acid | 4 |
| Butyl stearate | 4 |
| Methyl ethyl ketone/Cyclohexanone (1:1) | 800 |

The above composition was kneaded in a ball mill for 50 hours to obtain a magnetic coating composition, which was then coated by a doctor blade in a dry thickness of 5$\mu$ on a polyethylene terephthalate support having a thickness of 15$\mu$ and having a surface roughness (Ra) of 0.025 $\mu$m. The coated layer was subjected to orientation with a cobalt magnet and the solvent was evaporated at 100° C. for 1 min. The coated layer was subjected to a smoothing treatment with calender rolls composed of five pairs of rolls, with each pair including a cotton roll and a mirror roll (a roll temperature: 60° C., pressure: 100 kg/cm$^2$). An electron beam with an accelerating voltage of 200 kv and a beam current of 10 mA was radiated so that the absorption dose was 10 Mrad. The resulting sample was identified as Sample No. 1.

EXAMPLE 2

The same procedure as described in Example 1 was repeated but using a support having a surface roughness (Ra) of 0.035 $\mu$m. The resulting sample was identified as Sample No. 2.

COMPARATIVE EXAMPLE 1

The same procedure as described in Example 1 was repeated but using a support having a surface roughness (Ra) of 0.040 $\mu$m. The resulting sample was identified as Sample No. 3.

COMPARATIVE EXAMPLE 2

The same procedure as described in Example 1 was repeated but using the following binder to prepare Sample No. 4. The roll temperature of the calendering treatment was 30° C. The surface roughness of the magnetic layer was the same as that of Sample No. 1.

| | parts |
|---|---|
| Urethane resin (same as Example 1) | 62 |
| Ester acrylate oligomer (Aronix M6100) | 30 |
| Trimethylolpropane triacrylate | 8 |

COMPARATIVE EXAMPLE 3

The same procedure as described in Example 1 was repeated but using the following binder to prepare Sample No. 5.

| | parts |
|---|---|
| Nitrocellulose (same as Example 1) | 62 |
| Ester acrylate oligomer (Aronix M6100) | 30 |
| Trimethylolpropane triacrylate | 8 |

EXAMPLE 3

The same procedure as described in Example 1 was repeated but using the following binder to prepare Sample No. 6.

| | parts |
|---|---|
| Copolymer of vinyl chloride-vinyl acetate-vinyl alcohol (copolymerization ratio: 89:3:8) | 50 |
| Urethane resin (same as Example 1) | 15 |
| Urethane acrylate oligomer ("Aronix M1100" prepared by Toagosei Chemical Industry Co., Ltd.) | 30 |
| Trimethylolpropane triacrylate | 5 |

EXAMPLE 4

The same procedure as described in Example 1 was repeated but using the following binder to prepare Sample No. 7.

|  | parts |
| --- | --- |
| Vinyl chloride-vinyl acetate-maleic acid copolymer (copolymerization ratio: 92:4:4) | 40 |
| Urethane resin (same as Example 1) | 30 |
| Trimethylolpropane triacrylate | 30 |

Samples of Examples 1 to 4 and Comparative Examples 1 to 3 were run on a video tape recorder for 100 passes in order to measure their dynamic friction coefficient, time of durability at still mode and squareness ratios (residual flux density/maximum flux density). The results obtained are shown in Table 1.

TABLE 1

| Sample No. | Dynamic Friction Coefficient after Repeated Runs*[1] | Head Wear ($\mu$) | Time of Durability at Still Mode*[2] | Chroma S/N*[3] (dB) |
| --- | --- | --- | --- | --- |
| 1 | 0.23 | 1.5 | more than 60 min. | 0 |
| 2 | 0.20 | 2 | more than 60 min. | −0.5 |
| *3 | 0.19 | 10 | more than 60 min. | −3.0 |
| *4 | Tape run stopped due to adhesion to a magnetic head | 8 | 3 min. | −2.5 |
| *5 | 0.50 | 9 | 8 min. | −1.7 |
| 6 | 0.20 | 1.8 | more than 60 min. | +0.3 |
| 7 | 0.19 | 2.1 | more than 60 min. | +0.5 |

*Comparative Sample
*[1]Dynamic friction coefficient was indicated in terms of "$\mu$" value calculated by the following equation, using a VHS type video tape recorder (trade name: NV-8200, manufactured by Matsushita Electric Industrial Co., Ltd.) at 40° C. and 65% relative humidity: $T_2/T_1 = e^{\mu\pi}$ where $T_1$ is a tape tension at the supply side of the rotary cylinder of VTR and $T_2$ is a tape tension at the take-up side of the rotary cylinder of VTR, whereby the effect of $T_1$ is removed from $T_2$ when $T_2$ is far larger than $T_1$. Running tension was evaluated in terms of $\mu$. Values indicated in Table 1 were obtained after 100 passes.
*[2]The time of durability at still mode was determined by recording predetermined video signals on video tapes (each samples) using a VHS type video tape recorder (trade name: NV-8200, manufactured by Matsushita Electric Industrial Co., Ltd.), and measuring the period of time until the reproduced still images loose their clearness at 5° C. and 65% relative humidity.
*[3]S/N of video color signals (chroma S/N) of each samples were measured and compared to that of Sample No. 1 as a reference tape that was assumed to have 0 dB.

As is apparent from the results shown in Table 1, the magnetic recording media according to the present invention (Examples 1 to 4) show markedly excellent electromagnetic properties, running properties and durability, etc., as compared with those of Comparative Examples 1 to 3 (Sample Nos. 3 to 5). More specifically, Sample No. 3 using a support having an average center line roughness (Ra) of 0.04 $\mu$m showed dynamic friction coefficient and still life properties substantially equivalent to those of Sample No. 2 (Ra=0.035 $\mu$m) after repeated runs, but showed a higher degree of head wear and a markedly poor chroma S/N. Sample No. 4 using no polymer (1) and Sample No. 5 using no urethane resin (2) as a binder component showed poor results with respect to all test items as compared with Samples Nos. 1, 2, 6 and 7 according to the present invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support base having an average center line roughness (Ra) of 0.035 $\mu$m or less, the support base having coated thereon a magnetic layer containing ferromagnetic fine particles and the layer further containing:
   (1) a polymer selected from the group consisting of vinyl chloride-vinyl acetate-type resins and vinyl chloride-vinyl propionate-type resins having a molecular weight in the range of about 20,000 to about 100,000 and having a vinyl chloride/vinyl acetate weight ratio of 80/20 to 95/5 or a vinyl chloride/vinyl propionate weight ratio of from 80/20 to 95/5;
   (2) a urethane resin; and
   (3) a compound having two or more of acrylate groups or methacrylate groups in the molecule thereof, said magnetic layer being cured by radiation with electron beams, wherein the mixing ratio of the polymer (1)/the urethane resin (2) is in the range of 20 to 90 parts by weight/80 to 10 parts by weight and wherein the compound (3) is present in an amount of 50 to 400 parts by weight per 100 parts by weight of the mixtures of the polymer (1) and the urethane resin (2).

2. A magnetic recording medium as claimed in claim 1, wherein said polymer (1) is selected from the group consisting of, a copolymer of vinyl chloride-vinyl acetate-vinyl alcohol (vinyl alcohol content being 1 to 15 wt%) and a copolymer of vinyl chloride-vinyl acetate-maleic acid (maleic acid content being 0.5 to 10 wt%).

3. A magnetic recording medium as claimed in claim 1, wherein said urethane resin (2) has a molecular weight in the range of about 5,000 to about 100,000.

4. A magnetic recording medium as claimed in claim 3, wherein the urethane resin has a molecular weight in the range of 10,000 to 50,000.

5. A magnetic recording medium as claimed in claim 1, wherein the compound (3) has a molecular weight in the range of 1,000 to 20,000.

6. A magnetic recording medium as claimed in claim 1, wherein the mixing ratio of the polymer (1)/the urethane resin (2) is in the range of 40 to 80 parts by weight/60 to 20 parts by weight.

7. A magnetic recording medium as claimed in claim 1, wherein the compound (3) is present in an amount in the range of 80 to 250 parts by weight per 100 parts by weight of the mixture of the polymer (1) and the urethane resin (2).

8. A magnetic recording medium as claimed in claim 1, wherein the magnetic layer is cured by electron beams applying an absorption dose in the range of 0.5 to 20 megarads.

9. A magnetic recording medium as claimed in claim 8, wherein the absorption dose is in the range of 1 to 15 megarads.

10. A magnetic recording medium as claimed in claim 1, wherein said average center line roughness (Ra) is in the range of 0.005 to 0.035 $\mu$m.

11. A magnetic recording medium as claimed in claim 1, wherein said polyurethane is a polyether urethane or a polyester urethane.

12. A magnetic recording medium as claimed in claim 1, wherein said compound (3) is selected from the group consisting of diethylene glycol diacrylate, trimethylolpropane triacrylate and triethylene glycol diacrylate.

13. A magnetic recording medium as claimed in claim 1, wherein said urethane resin (2) has a molecular weight in the range of about 5,000 to about 100,000, the mixing ratio of the polymer (1)/the urethane resin (2) is in the range of 20 to 90 parts by weight/80 to 10 parts by weight, wherein the compound (3) is present in an amount in the range of 80 to 250 parts by weight per 100 parts by weight of the mixture of the polymer (1) and the urethane resin (2), wherein the magnetic layer is cured by electron beams applying an absorption dose in the range of 0.5 to 20 megarads and wherein the average center line roughness (Ra) is in the range of 0.005 to 0.35 μm.

14. A magnetic recording medium as claimed in claim 13, wherein said compound (3) is selected from the group consisting of diethylene glycol diacrylate, trimethylolpropane triactrylate and triethylene glycol diacrylate.

* * * * *